United States Patent [19]
Heyne

[11] 3,752,305
[45] Aug. 14, 1973

[54] PLASTIC CARRIER FOR CONTAINERS
[75] Inventor: Clarence A. Heyne, Toledo, Ohio
[73] Assignee: Owens-Illinois, Inc., Toledo, Ohio
[22] Filed: May 10, 1971
[21] Appl. No.: 141,491

[52] U.S. Cl.............. 206/65 E, 220/116, 294/87.2
[51] Int. Cl....................... B65d 71/00, B65d 85/62
[58] Field of Search ........................ 206/65 E, 65 C; 220/116; 215/12 R, 38 A; 294/87.2; 224/45 AB

[56] References Cited
UNITED STATES PATENTS

| 3,302,783 | 2/1967 | Lyon | 206/65 C |
| 3,086,651 | 4/1963 | Poupitch | 206/65 E |
| 2,936,070 | 5/1960 | Poupitch | 206/65 C |
| 3,604,584 | 9/1971 | Shank, Jr. | 215/12 R |

FOREIGN PATENTS OR APPLICATIONS

| 1,490,673 | 6/1967 | France | 206/65 C |

Primary Examiner—William T. Dixson, Jr.
Attorney—J. E. Nelson and E. J. Holler

[57] ABSTRACT

The invention disclosed relates to a multi-pak plastic jacket-type container carrier. The carrier is thermoformed from thermoplastic sheet or web stock and provides individual compartments or cavities in annular substantially sleeve form. The upper annular margin of the compartment wall includes a radially inwardly directed lip or rim that permits container movement into the carrier and engages a bead or edge at the upper end of the container upon reverse movement, thereby retaining the container in suspended support for transport. The carrier has a tear strip means at each cavity for removal of the container and includes finger carrying means for transport.

5 Claims, 4 Drawing Figures

Patented Aug. 14, 1973

INVENTOR.
CLARENCE A. HEYNE
BY J. R. Nelson &
E. J. Haller
ATTORNEYS

Patented Aug. 14, 1973

INVENTOR.
CLARENCE A. HEYNE
BY J. R. Nelson &
E. J. Holer
ATTORNEYS

PLASTIC CARRIER FOR CONTAINERS

The present invention relates to a carrier for containers in the form of a premolded plastic jacket.

Several prior wrap-around forms of carrier for containers, such as glass bottles, have been utilized. The present invention provides a simpler and economical form of carrier for containers of composite construction wherein the glass bottles are covered with a side wall cushioning layer or sleeve of material.

SUMMARY OF THE INVENTION

The invention provides an economical jacket-like carrier of plastic formed to telescope relative to glass containers receiving their glass neck portion and tightly engaging the side wall of the several containers in the group. The carrier houses glass containers having sleevelike coverings over substantial part of their side wall area, the final container package providing full light protection for the container contents and protection against surface abuse of the glass containers.

DESCRIPTION

Figure 1:
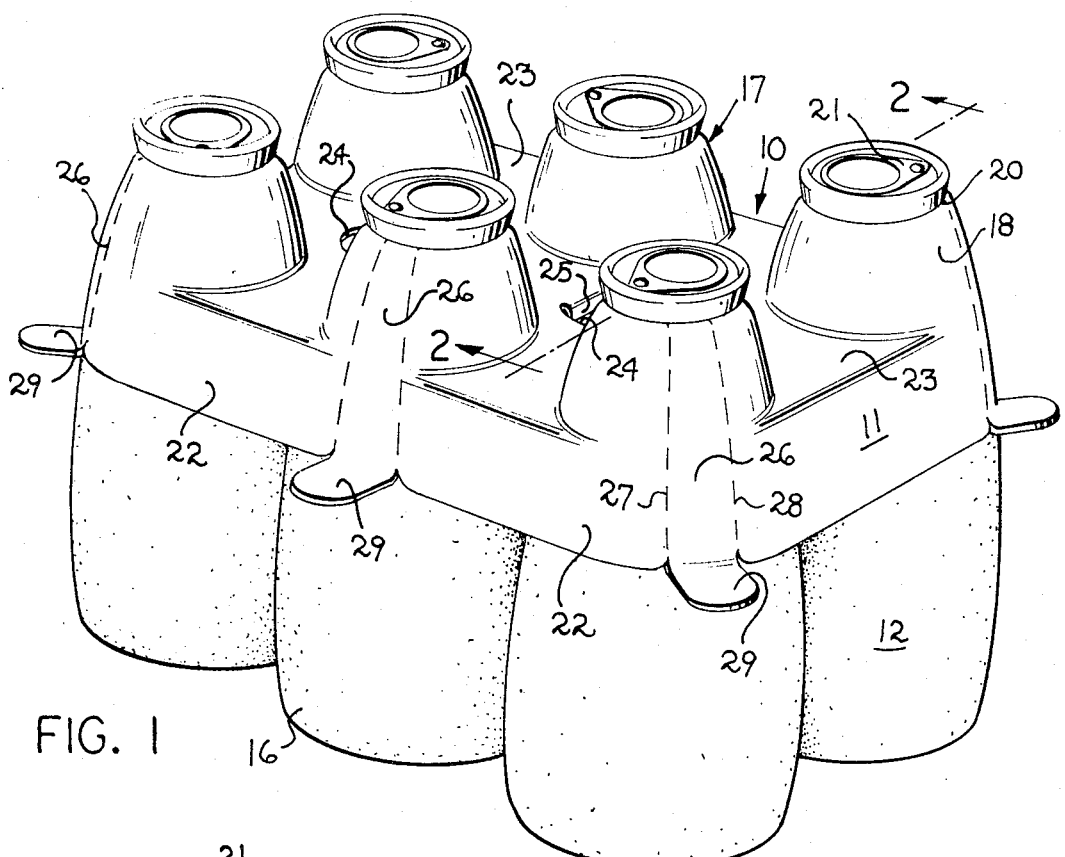
FIG. 1 is a three-quarter front perspective view of the container package of the invention.
Figure 2:
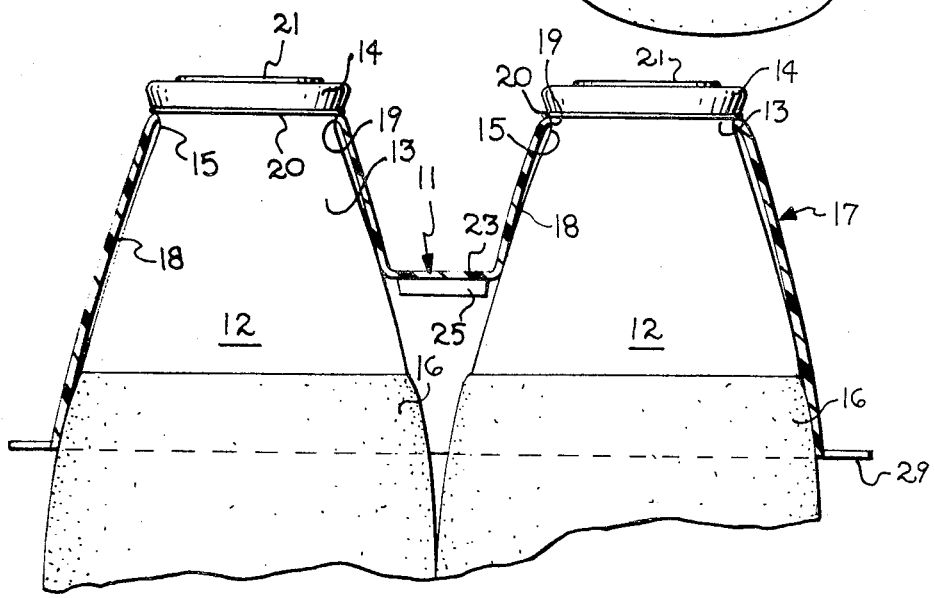
FIG. 2 is a sectional elevational view taken along line 2—2 on FIG. 1.

Referring to FIGS. 1 and 2, the package 10 embodying the invention comprises a plastic carrier 11 and a plurality of composite glass-plastic containers 12. The container 12 has a bottom end wall supporting it in upright position. Contiguous with the bottom wall is a glass body wall which tapers upwardly into the wall at neck portion 13 (see FIG. 2). At the upper end of neck 13 is an annular rim of the glass bottle defining its upper end opening which is enclosed by the closure 14. Closure 14 extends over the rim or bead of the bottle and is crimped or contracted therebelow along the side wall at neck 13. Closure 14 provides an enlarged annular region above a reverse taper or undercut region 15. The container 12 is supported in the carrier just above this region in a manner to be presently described.

Containers 12 include a sleeve-like body covering 16 that is form fitting on the body wall of the bottle. Covering 16 may be formed from a shrunken plastic material.

Carrier 11 is comprised of plastic and is conveniently thermoformed from a sheet or web of thermoplastic material. Suitable compositions which may be employed to produce a semi-rigid carrier member are polyethylene of high or medium density composition, polypropylene, and polyvinyl chloride.

The plastic carrier is shaped by a mold to include several individual cavities or cell-like compartments 17 that are open at their opposite axial ends. The compartments 17 are each defined by an annular wall 18 made to correspond generally to the shape of the upper portion of the container 12 along neck portion 13.

The top edge of each compartment wall 18 is directed radially inwardly to provide an annular rim edge 19 that defines an upper end aperture for the compartment. The inwardly directed edge 19 of wall 18 is yieldable radially and axially and provides a limited yieldable aperture of a diameter slightly less than the major external diameter of the neck closure 14.

The containers 12 are shown in place on FIGS. 1 and 2 with the closures 14 extending upwardly through the respective compartment 17 apertures. As the containers are assembled in the compartments, the plastic carrier 11 and containers 12 are relatively, telescopically axially moved into engagement such that the closures 14 distend the relatively limited, yieldable apertures at the annular rim 19 which are upwardly directed. Upon any opposite axial movement of the containers in their compartments, rim 19 thereof engages the lower skirt edge 20 of the closure and retains the bottle with the carrier.

The closure 14 may be of various known types, the type illustrated on FIGS. 1 and 2 being the top ring-pull version of convenience opening bottle closure including the top ring-pull device 21. The function of such closure is described in U.S. Pat. No. 3,561,631.

Integral with the annular upright walls 18 of carrier 11 is a vertical, peripheral skirt wall 22 for carrier 11. Skirt wall 22 encircles the grouping of containers 12 in the compartments 17 (in the illustration, 6 containers are in such grouping; however, any convenient number may be selected for the grouping of containers). Vertical wall 22 blends smoothly and integrally (contiguously) with the adjacent portion of the annular wall 18 of the several peripherally arranged compartments. The dimensions of skirt wall 22 are selected to meet two functional objectives: (1) the perimeter length should encircle the bodies of the containers to closely or snugly lash them together, restraining their relative lateral movement, and (2) the vertical dimension of the skirt wall should be selected to provide protection for the containers. In this latter regard, the covered containers 12 illustrated have the plastic 16 extending into the neck region of the glass bottle (see FIG. 2). The vertical skirt wall should extend to meet the top margin of this covering 16 or, as is illustrated, overlap with it. In the event the bottles 12 are not plastic covered (bare glass bottles), the vertical skirt wall 22 should extend downwardly overlying the region of the glass bottles that represent their largest body diameter. This will prevent their sidewise or lateral contact with adjacent bottles in other packages or contact with vertical walls, guides, etc.

At the top margin of vertical skirt wall 22 is the integral, contiguously formed horizontal wall means 23. This connects each of the annular sleeve walls 18 as well as skirt wall 22 and provides further structural properties to the carrier 11 and package 10. Additionally, horizontal wall 23 provides the means for lifting and handling carrier 11 at the two spaced finger holes 24 therein. Holes 24 are formed with a downturned pad section 25 that obviates the sharp edge of holes 24 to finger-hand pressure of the carrier.

An important feature of the invention is the position of wall 23 in the carrier elevation. By locating wall 23 well in the intermediate height region of the cells 17 of carrier 11, sufficient structural support of the carrier may be achieved. As an optional use alternative, carrier 11 may be filled with empty containers 12 so that their necks 13 without closures extend through apertures 19 of the compartments. The package of empty containers may now be processed as a group of containers through a multiple (gang-type) filler and the group or groups of bottles filled simultaneously. Next the filled containers are processed through a multiple head capper and closures, such as 14 on FIG. 1, applied on the group of bottles 12. The fact the horizontal wall 23 is located well below the tops of the bottle compartments allows normal capping of the bottles 12 in place in carrier 11.

To remove the bottles 12 from the carrier, each compartment wall 18 is provided with a generally vertically directed integral tear strip 26. The tear margins of strip 26 may be formed by lines of weakening 27 and 28 in the compartment wall 18, such as by scoring or perforating the plastic in the formation of the plastic. The tear strips 26 extend downwardly along the vertical skirt wall 22 to the bottom edge. For convenient access to tear strips 26, each has an integral end tab 29 which may be turned laterally in use or lie flat on the bottle wall at initial assembly of the package and prior to tear strip use. Tear strip 26 will sever the vertical skirt wall 22 and vertical annular compartment wall 18 through the rim section 19 of the compartment. This will free the container for removal from carrier 11.

Figure 3:
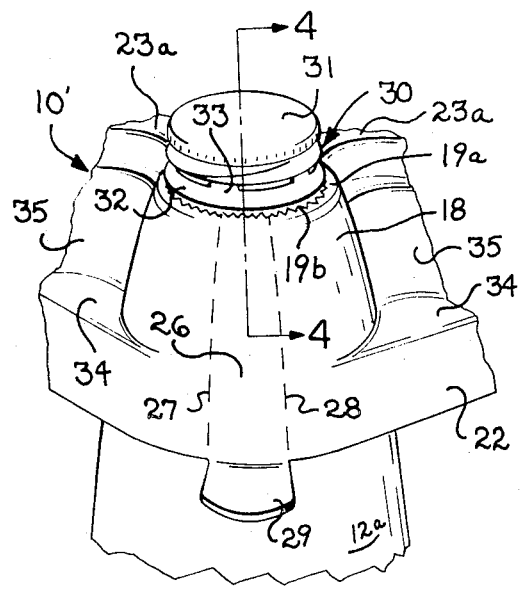
FIG. 3 is a fragmentary perspective view of a variation of the container package of the invention.
Figure 4:
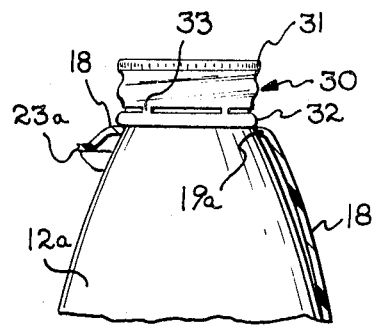
FIG. 4 is a sectional elevational view taken along line 4—4 on FIG. 3.

Referring to FIGS. 3 and 4, a second form of the invention is illustrated. The container 12a consists of a narrow neck type glass bottle having a threaded neck finish 30 over which is applied a rolled-on aluminum screw threaded closure 31. The lower band section 32 of the closure skirt is applied over an annular raised rib of the bottle neck and compressed in conventional fashion. The vertical straps 33 of the closure connect this lower band section 32 with the upper threaded skirt portion of closure 31 to provide a tamper proof indicia. Other roll-on metal closure versions omit this tamper proof band 32 and thus a raised rib of the bottle neck appears as an uncovered bulged portion of the bottle finish.

The carrier 11 is essentially like the structure above described for the embodiment of FIGS. 1 and 2 and comprises the annular vertical compartment walls 18 for the appropriate grouping of bottles. The vertical skirt wall 22 extends around the perimeter of the grouping of bottles 12a and this joins with the top horizontal wall 23a through a lower horizontal section of wall 34 and an inner vertical wall 35. The wall 18, as seen on FIG. 4, extends to the top in-turned, yieldable, annular portion 19a which has an inner-facing serrated rim surface 19b that defines the top aperture of the compartment 17 for the bottle. The finger holes are formed in the top horizontal wall 23a in the manner previously described to provide a carrying means for package 10'. Bottles 12a are assembled in much the same manner as before. The closures 31 extend through the aperture of rim 19b so that the lead-in portion 19a flexes upwardly and outwardly receiving the bottle past its neck bulge or bead 32 (see FIG. 4). The rim edge 19 b then seats below the bulge or bead at 32 holding the bottle in its compartment for carriage. Skirt wall 22 encircles the bottles snugly preventing appreciable sidewise displacement.

The compartments 17 are opened in the same manner by the pre-weakened tear strip lines 27 and 28 defining a vertical tear strip 26 extending through the rim 19b. Tear strip 26 is operated in opening a bottle compartment by tear tab 29 at the lower edge of skirt wall 22.

The carrier 11, in either form of the invention, may be thermoformed or molded of plastic and is conveniently formed from thermoplastic sheet or by injection molding of thermoplastic material. Carrier 11 is preferably constructed of a thermoplastic that will produce a rigid or semi-rigid member. Example of such thermoplastic materials are polyvinyl chloride, polyethylene of the high or medium density types or compositions, and polypropylene. A suitable carrier may be made to about 0.025 inch thickness in high density polyethylene that is thermally molded to a structure like carrier 11.

The bottles illustrated may be either covered with the plastic sleeve, as 16 on FIGS. 1 and 2, or may be a bare glass bottle usually labelled or conventionally decorated. The plastic covered bottles, such as bottle 12 herein, need less skirt height to afford overall light and body wall protection for the containers and their product contents. Bare glass bottles, such as illustrated herein on FIGS. 3 and 4, should have the vertical extent of the carrier skirt extend to or below the major (maximum) body diameter point of the bottles for protection of the bottles from side wall abuse. And, if the contents are to be afforded protection against light radiation effects the skirt wall for this type bottle (bare glass) should extend the height of the bottle.

Having shown and described several forms of the invention, other forms and variations should occur to those persons skilled in the art. It is the purpose of this disclosure to limit the scope of coverage of the invention only by the appended claims.

I claim:

1. A combination comprising a grouping of a plurality of glass containers, each in upright position, having a base, body portion, upwardly tapered neck portion, and closure applied over the neck portion, and a one-piece carrier for said containers in suspended relation, said carrier including plural annular, upwardly tapered walls individually extending adjacent the tapered necks of said containers, a radially inwardly directed annular rim edge on each of the tapered walls, said edge providing an inwardly facing circumference slightly smaller than the external circumference of said closure on the container, said rim edge defining an aperture through which the upper end of the neck portion of the container and closure are telescopically assembled in the carrier and the annular rim edge engages the closure in the reverse movement of the container a peripheral skirt wall integral with each of said tapered walls and extending peripherally around said grouping of containers, said skirt wall extending axially downwardly along the neck portion and at least part of the body of the containers, a top wall of said carrier integral with all of said tapered walls and spaced below each said rim edge, means on said top wall for hand carrying the carrier, the containers being suspended from the respective rim edges by their closures, the grouping of containers being engaged by said peripheral skirt wall preventing lateral displacement within the carrier, and tear out means defined axially in each said annular tapered wall and through said adjacent skirt wall for releasing the containers individually from the carrier.

2. The combination defined by claim 1, wherein said upwardly tapered walls and said peripheral skirt wall together are greater than one-half the height of containers supported in the carrier.

3. A unitary, one-piece receptacle for retaining an array of glass containers comprised of at least a pair of adjacently positioned containers having a circumferential enlargement portion near the upper end thereof and arranged in upright, side-by-side relationship, and having an upper end closure thereon, comprising an integral thermoplastic cover member having an endless upright perimeter wall adapted to extend around the array of containers for covering a substantial portion of their axial length, individual substantially frusto-conical, cell-like compartments defined by a wall extending above said upright perimeter wall and each compartment adapted to telescope over the top of a container of said array, said compartments being integrally joined with said upright perimeter wall, and a flexible, integral annular radial inwardly facing rim edge defining an aperture at the top end of said compartment wall having a lesser diameter than said compartment and said enlargement portion of, the containers and engageable therewith to support the container in said compartment and suspend it therein for transport by said cover element, an axially extending tear strip formed in each compartment wall and the adjacent perimeter wall said strips being each severable for removal of the containers individually from said compartments, and means formed in said cover element for hand grasping and carrying the receptacle and contents suspendedly held in the compartments thereof.

4. The receptacle of claim 3, wherein said thermoplastic comprises polyethylene.

5. The receptacle of claim 3, wherein the inwardly, facing rim edge is serrated and the wall adjacent said edge is flexible and normally upwardly directed permitting entry passage in one axial direction of the circumferential enlargement portion of the container and engaging said enlargement portion upon movement in the opposite direction and preventing withdrawal of the container.

* * * * *